US012111389B2

(12) United States Patent
Berry et al.

(10) Patent No.: US 12,111,389 B2
(45) Date of Patent: Oct. 8, 2024

(54) RADAR ELEVATION ANGLE VALIDATION (71) Applicant: Argo AI, LLC, Pittsburgh, PA (US)

(72) Inventors: Jonathan C. Berry, San Jose, CA (US); Duc H. Vu, Sunnyvale, CA (US)

(73) Assignee: Argo AI, LLC, Pittsburgh, PA (US)

(*) Notice: Subject to any disclaimer, the term of this patent is extended or adjusted under 35 U.S.C. 154(b) by 321 days.

(21) Appl. No.: 17/027,501

(22) Filed: Sep. 21, 2020

(65) Prior Publication Data
US 2022/0091254 A1  Mar. 24, 2022

(51) Int. Cl.
*G01S 13/86* (2006.01)
*G01S 13/58* (2006.01)
*G01S 13/931* (2020.01)

(52) U.S. Cl.
CPC ............ *G01S 13/865* (2013.01); *G01S 13/58* (2013.01); *G01S 13/931* (2013.01)

(58) Field of Classification Search
CPC ...... G01S 13/865; G01S 13/58; G01S 13/931; G01S 7/4034; G01S 7/4086; G01S 7/40; G01S 3/14; G01S 3/782; G01S 7/497; G01S 7/4972; G01S 13/424
USPC .......................................................... 342/56
See application file for complete search history.

(56) References Cited

U.S. PATENT DOCUMENTS

| 6,363,619 B1* | 4/2002 | Schirmer ............. G01M 11/067 33/600 |
| 6,556,166 B1* | 4/2003 | Searcy .................. G01S 7/4026 343/703 |
| 6,809,806 B1* | 10/2004 | Carnevale ............. G01S 7/4026 356/138 |
| 10,585,170 B2* | 3/2020 | Hellinger .............. G01S 7/4026 |
| 2004/0178943 A1 | 9/2004 | Niv |

(Continued)

FOREIGN PATENT DOCUMENTS

| WO | 2016025683 A1 | 2/2016 |
| WO | 2019200178 A1 | 10/2019 |

OTHER PUBLICATIONS

Linear regression—Wikipedia.pdf from https://web.archive.org/web/20200430201339/http://en.wikipedia.org:80/wiki/Linear_regression (Year: 2020).*

(Continued)

*Primary Examiner* — Olumide Ajibade Akonai
*Assistant Examiner* — Yonghong Li
(74) *Attorney, Agent, or Firm* — Fox Rothschild LLP (57) ABSTRACT

Devices, systems, and methods are provided for radar elevation angle validation. A radar elevation angle validation device transmit, from a radar, one or more signals towards a corner reflector situated in a direction of the radar. The radar elevation angle validation device may receive, at the radar, reflected signals from the corner reflector. The radar elevation angle validation device may measure signal energy of at least one of the reflected signals. The radar elevation angle validation device may access a baseline dataset based on the measured signal energy. The radar elevation angle validation device may retrieve a radar elevation angle from the baseline dataset corresponding to the measured signal energy. The radar elevation angle validation device may compare the radar elevation angle to a validation threshold. The radar elevation angle validation device may determine a radar validation status based on the comparison.

17 Claims, 6 Drawing Sheets

(56) References Cited

U.S. PATENT DOCUMENTS

| | | | |
|---|---|---|---|
| 2008/0111733 A1 | 5/2008 | Spyropulos et al. | |
| 2009/0002222 A1 | 1/2009 | Colburn et al. | |
| 2010/0066587 A1* | 3/2010 | Yamauchi | G05D 1/0044 |
| | | | 342/54 |
| 2011/0006941 A1 | 1/2011 | Samukawa et al. | |
| 2012/0249363 A1 | 10/2012 | Kolinko et al. | |
| 2013/0151135 A1 | 6/2013 | Aubrey et al. | |
| 2014/0104051 A1 | 4/2014 | Breed | |
| 2015/0204972 A1 | 7/2015 | Kuehnle et al. | |
| 2019/0086512 A1* | 3/2019 | Bilik | G01S 13/878 |
| 2020/0033445 A1* | 1/2020 | Raphaeli | G01S 13/003 |
| 2020/0142027 A1* | 5/2020 | Lee | G01S 7/4086 |

OTHER PUBLICATIONS

Lee et al. "Tilted-Beam Switched Array Antenna for UAV Mounted Radar Applications with 360° Coverage", Electronics, 2019, pp. 1-11, vol. 8, issue 11, Multidisciplinary Digital Publishing Institute (MDPI), Korea.

Sun et al. "Ultra-Wideband Imaging Radar to Reveal Obstacles Concealed in Vegetation to Improve Navigation of Unmanned Ground Vehicles", Journal of Electromagnetic Waves and Applications, 2014, pp. 1305-1315, vol. 28, Issue 11, Korea.

Extended European Search Report of European application No. 21197124.7 dated Feb. 15, 2022, 7 pages.

\* cited by examiner

RADAR ELEVATION ANGLE VALIDATION

TECHNICAL FIELD

This disclosure generally relates to systems and methods for radar elevation angle validation.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise radars, visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle.

However, disoriented sensors may capture unreliable data. Therefore, there is a need to enhance the proper orientation of sensors to ensure that captured data does not undermine the sensor system performance.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include LIDAR sensors, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real world and rely on the attached sensors to perform to a certain performance level under environmental factors. As the autonomous vehicles are driven in the real world, sensors such as radar rely on accurate detection of signals reflected from objects in the vicinity of the autonomous vehicle. A problem may exist in the uncertainty of radar elevation angle detection when it is mounted, for example, to a vehicle. Radar alignment uncertainty can lead to radar data uncertainty. For example, an accurate radar elevation angle helps to detect objects at a distance optimal for that radar. However, if radar elevation angle detection is flawed due to being off by some degrees, objects will be detected at a reduced distance. Azimuthal alignment errors can be detected with direct radar Angle-of-Arrival direction estimation right out of the radar when a particular target's relative angle is already known. Other means of measuring a radar elevation angle (also known as a radar pitch angle) may include measurements by some means of laser scanning or some mechanical measurement. However, that is feasible when the radar is not covered by a fascia or other vehicle material. It is an objective to measure an elevation angle of the radar without making changes to the vehicle. It is desirable to determine a radar's elevation angle by analyzing the radar output with its surrounding.

Example embodiments described herein provide certain systems, methods, and devices for radar elevation angle validation.

In one or more embodiments, a radar elevation angle validation system may facilitate means for validating a radar elevation angle based on characterizing a number of signal energy values associated with a radar's reception of feedback signals received from a reflective structure.

In one or more embodiments, a radar elevation angle validation system may facilitate the use of a corner reflector placed at a certain location relative to a radar under test. A corner reflector consists of three mutually perpendicular, intersecting flat surfaces, which reflect waves directly towards the source. The three intersecting surfaces often have square shapes. Radar corner reflectors made of metal are used to reflect radio waves from radar sets. Optical corner reflectors, called corner cubes, made of three-sided glass prisms, are used in surveying and laser ranging. When the corner reflector is not directly facing the radar, and as the corner reflector turns away from the radar, it causes the corner reflector to be turned off because it becomes far less reflecting.

In one or more embodiments, a radar elevation angle validation system may facilitate the use of a corner reflector having a front reflective face surrounded by anechoic foam. The anechoic helps to absorb radio waves or signals received from the radar. The corner reflector may be placed at a different elevation and distance from the radar under test. In one or more embodiments, a radar elevation angle validation system may facilitate capturing data associated with signals received at the radar, based on reflected waves from the corner reflector. A radar elevation angle validation system may filter out the noise from surrounding objects reflecting back the waves by identifying the corner reflector by looking for an equivalent pattern response.

In one or more embodiments, a radar elevation angle validation system may facilitate correlating the signal energy values received at a radar under test with the average energy pattern based on the assumption that an energy pattern of the radar includes a maximum point of radiation, which is at an elevation angle of zero degrees, such that the general pattern tapers off as the elevation angle increases or decreases. It is further assumed that, in general, radars that are used in an application such as a vehicle have similar energy patterns such that they follow the same trend, and the maximum radiation is approximately at the same location on the energy pattern.

In one or more embodiments, a radar elevation angle validation system may perform signal measurements by varying the radar elevation angle by certain degrees to map out points on a curve resulting in an energy pattern. These measurements may be signal energy values associated with a radar's reception of feedback signals received from a reflective structure. An average energy pattern may be generated based on the measurements. The average energy pattern may become a baseline for validating the radar elevation angle of a radar under test.

In one or more embodiments, a radar elevation angle validation may generate entries in a lookup table that may form a dataset based on the signal measurements performed by varying the radar elevation angle and capturing signal energy levels as they are reflected by a corner reflector towards the radar. Each entry in the lookup table may be generated based on the location of the corner reflector, the location of the radar, a radar elevation angle, and a signal energy value. Based on varying the radar elevation angle, while the corner reflector is stationary at the same position, signal energy values may be captured for each of the radar elevation angles. These entries may be averages of various signal measurements taken using different radars. That is, the entries in the lookup table may be taken first of a first radar, then repeated for second radar, and so on. After all the values are captured, the baseline lookup table may be generated by averaging all the respected entries in the lookup tables associated with each radar. This may result in searchable dataset to retrieve relevant information based on the various signal measurements.

In one or more embodiments, a radar elevation angle validation system may validate a radar installed on a vehicle by placing the radar under test at a specific location relative to a corner reflector affixed at a specific elevation and distance from the radar under test.

In one or more embodiments, a radar elevation angle validation system may determine the position of a corner reflector. For example, a first corner reflector on the reflection structure may be located at a first distance and a first height relative to the radar under test. Based on that information, a radar under test may be validated by determining whether its radar elevation angle is what it is expected to be for that location of the corner reflector and the elevation and spacing of the radar under test from the corner reflector.

In one or more embodiments, a radar elevation angle validation system may utilize the baseline lookup table that may form a dataset to validate the radar under test by comparing a captured signal value to a corresponding entry in the baseline lookup table to retrieve a radar elevation angle. By placing the radar under test at a specific location, a signal energy level may be expected to be at a certain elevation angle. The radar under test may capture data (e.g., signal energy level) of the reflected signals from the corner reflector at that specific location. That entry of the baseline lookup table may indicate that the radar elevation angle should be at a certain value. If the value of the radar elevation angle is greater than a threshold, it may be determined that the radar has failed the validation test. If the value of the radar elevation angle is less than a threshold it may be determined that the radar has passed the validation test. For example, if the threshold is two degrees from the peak value, then if the corresponding entry in the lookup table returns a radar elevation value greater than two degrees from the peak value, it may be determined that the radar under test is either pitched too high or pitched too low from the optimal pitch angle of zero degrees. In such a case, the radar under test may be deemed to have failed the validation test. However, if the corresponding entry in the lookup table returns a radar elevation value lower than or equal to two degrees from the peak value, it may be determined that the radar under test is in a passing state.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
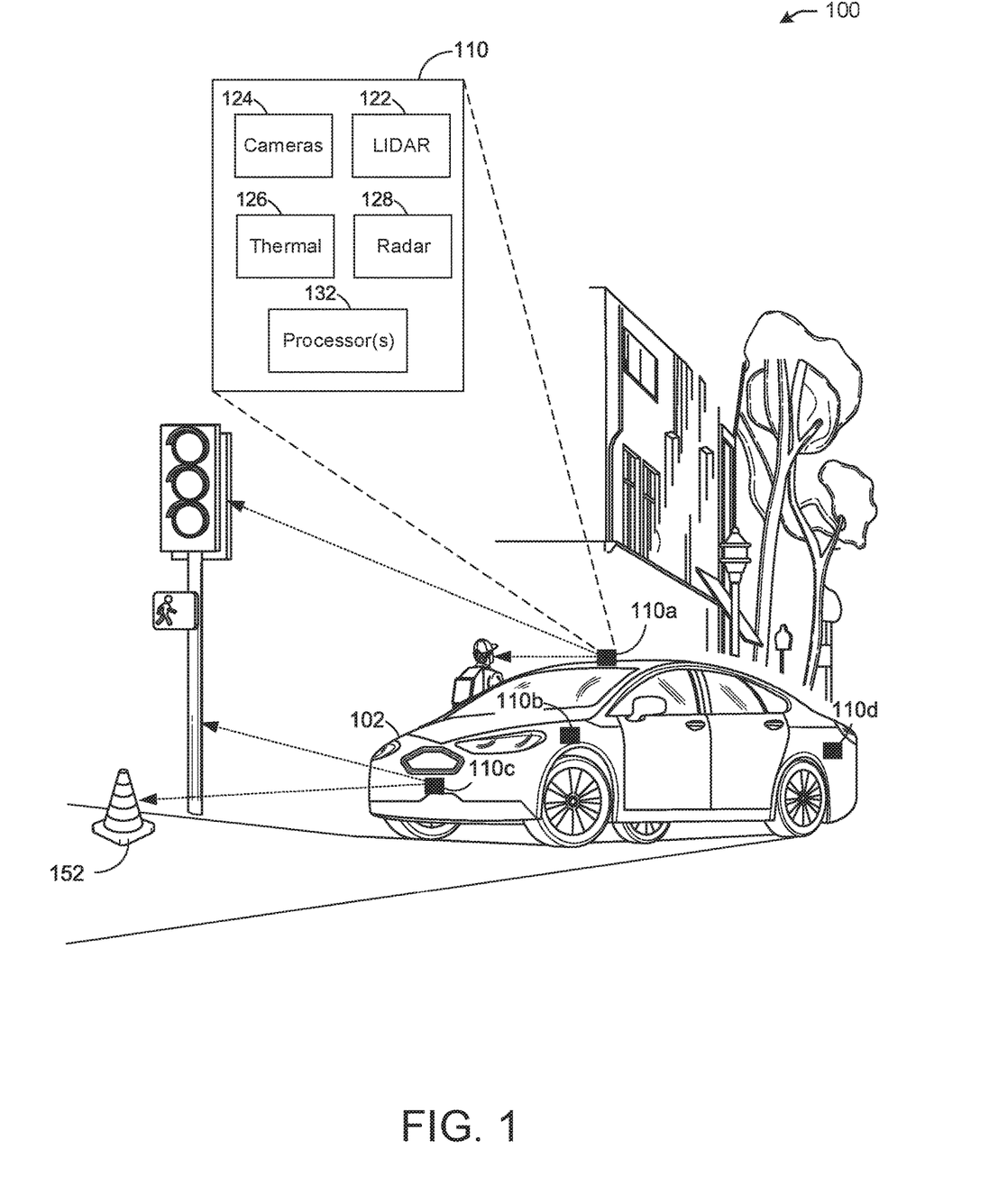
FIG. 1 illustrates an example environment of a vehicle, in accordance with one or more example embodiments of the present disclosure.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102. In this environment 100, there is shown that sensor system 110 includes sensors such as sensors 110a, 110b, 110c, and 110d. It should be noted that other sensors not shown in this figure may also be attached to the vehicle 102 and that the sensors 110a, 110b, 110c, and 110d are used for illustrative purposes. These sensors may detect objects (e.g., object 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processor(s) 132. The one or more processor(s) 132 may control the transmission and reception of signals using the LIDAR 122, the cameras 124, the thermal sensor 126, and the radar 128. The various sensors of the sensor system 110, when calibrated correctly, should indicate a proper distance and shape of object 152. However, the vehicle 102 may be subjected to environmental conditions such as vibration, thermal shock, or similar conditions. Under such conditions, the various sensors of the sensor system 110 may fall out of alignment. This would result in the data received from these various sensors to be unreliable when processed by processor(s) 132.

It is understood that the above descriptions are for purposes of illustration and are not meant to be limiting.

Figure 2:
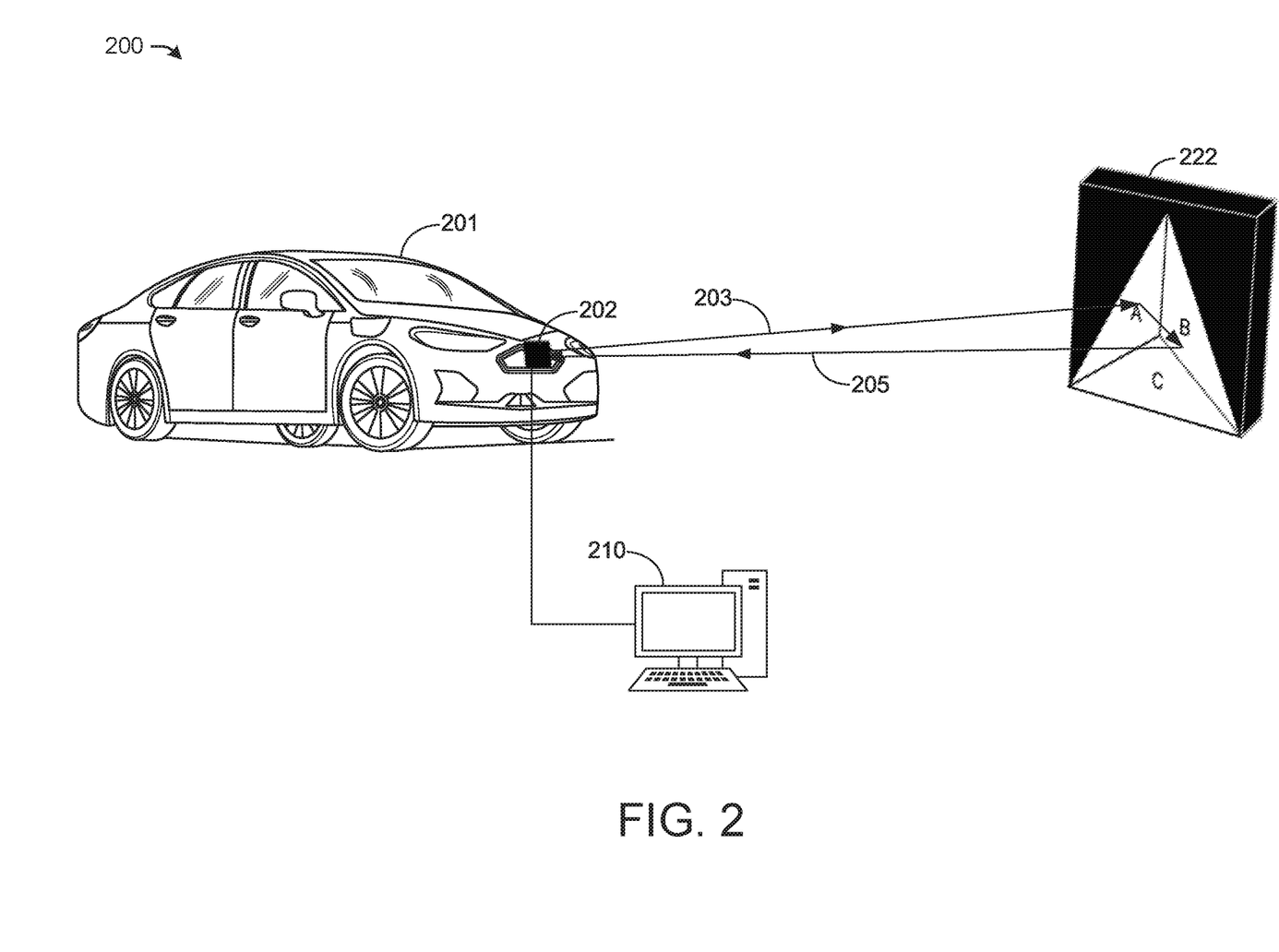
FIG. 2 depicts an illustrative schematic diagram for validation of radar elevation angle validation, in accordance with one or more example embodiments of the present disclosure.

FIG. 2 depicts an illustrative schematic diagram 200 for radar elevation angle validation, in accordance with one or more example embodiments of the present disclosure.

Referring to FIG. 2, there is shown a vehicle 201 having a radar under test 202 facing a corner reflector 222. The radar under test 202 may transmit a signal 203 towards the corner reflector 222. The corner reflector 222 may consist of three mutually perpendicular, intersecting flat surfaces (e.g., surfaces A, B, C). The corner reflector 222 may reflect waves back towards the source (e.g., the radar under test 202). The three intersecting surfaces A, B, and C, often have square shapes. Radar corner reflectors may be made of metal are used to reflect radio waves from radar sets. For example, as seen in FIG. 2, and echoed or reflected signal 205 may be returned to the radar under test 202. When the signal 203 is transmitted towards the corner reflector 222, the signal 203 bounces off of the surface A towards surface B before being reflected back as a reflected signal 205.

Signal loss may occur due to misalignment or disorientation of the radar elevation angle when facing the corner reflector 222. In some scenarios, the radar under test 202 may be situated at a particular elevation and a particular distance from the corner reflector 222. In addition, the radar under test 202 may need to be validated based on the reflected signal 205. Increased signal loss may indicate that the radar elevation angle of the radar under test 202 may not be pointed towards its maximum point of radiation, which is at an elevation angle of zero degrees.

In one or more embodiments, it is assumed that the radar under test 202 has an energy pattern that includes a maximum point of radiation at an elevation angle of zero degrees, such that the general pattern tapers off as the elevation angle increases or decreases. It is further assumed that, in general, radars that are used in an application such as a vehicle have similar energy patterns such that they follow the same trend, and the maximum radiation is approximately at the same location on the energy pattern.

In one or more embodiments, the radar under test 202 may collect data associated with the reflected signal 205. The data may be in the form of signal energy (e.g., signal to noise ratio (SNR) data, received signal strength indicator (RSSI), or other means of measuring signal energy levels) or any other data representing the reflected signal 205. This data may be captured by computer system 210. The computer system 210 may comprise a radar elevation angle validation module for evaluating whether the radar under test 202 passes a validation threshold. The computer system 210 may access a baseline lookup table to validate the radar under test 202 by comparing the energy level of the reflected signal 205 to a corresponding entry in the baseline lookup table to retrieve a radar elevation angle. By placing the radar under test 202 at a specific location, a signal energy level may be expected to be at a certain elevation angle. The radar under test 202 may capture data (e.g., signal energy level) of the reflected signal 205 from the corner reflector 222 at that specific location. That entry of the baseline lookup table may indicate that the radar elevation angle should be at a certain value. If the value of the radar elevation angle is greater than a validation threshold, it may be determined that the radar has failed the validation test and that adjustment may need to be made to the radar, or it may need to be replaced. If the value of the radar elevation angle is less than the validation threshold, it may be determined that the radar has passed the validation test. For example, if the threshold is two degrees from the peak value, then if the corresponding entry in the lookup table returns a radar elevation value greater than two degrees from the peak value, it may be determined that the radar under test is either pitched too high or pitched too low from the optimal pitch angle of zero degrees. In such a case, the radar under test may be deemed to have failed the validation test, and that adjustment may need to be made to the radar, or it may need to be replaced. However, if the corresponding entry in the lookup table returns a radar elevation value lower than or equal to two degrees from the peak value, it may be determined that the radar under test is in a passing state.

It is understood that the above descriptions are for purposes of illustration and are not meant to be limiting.

Figure 3:
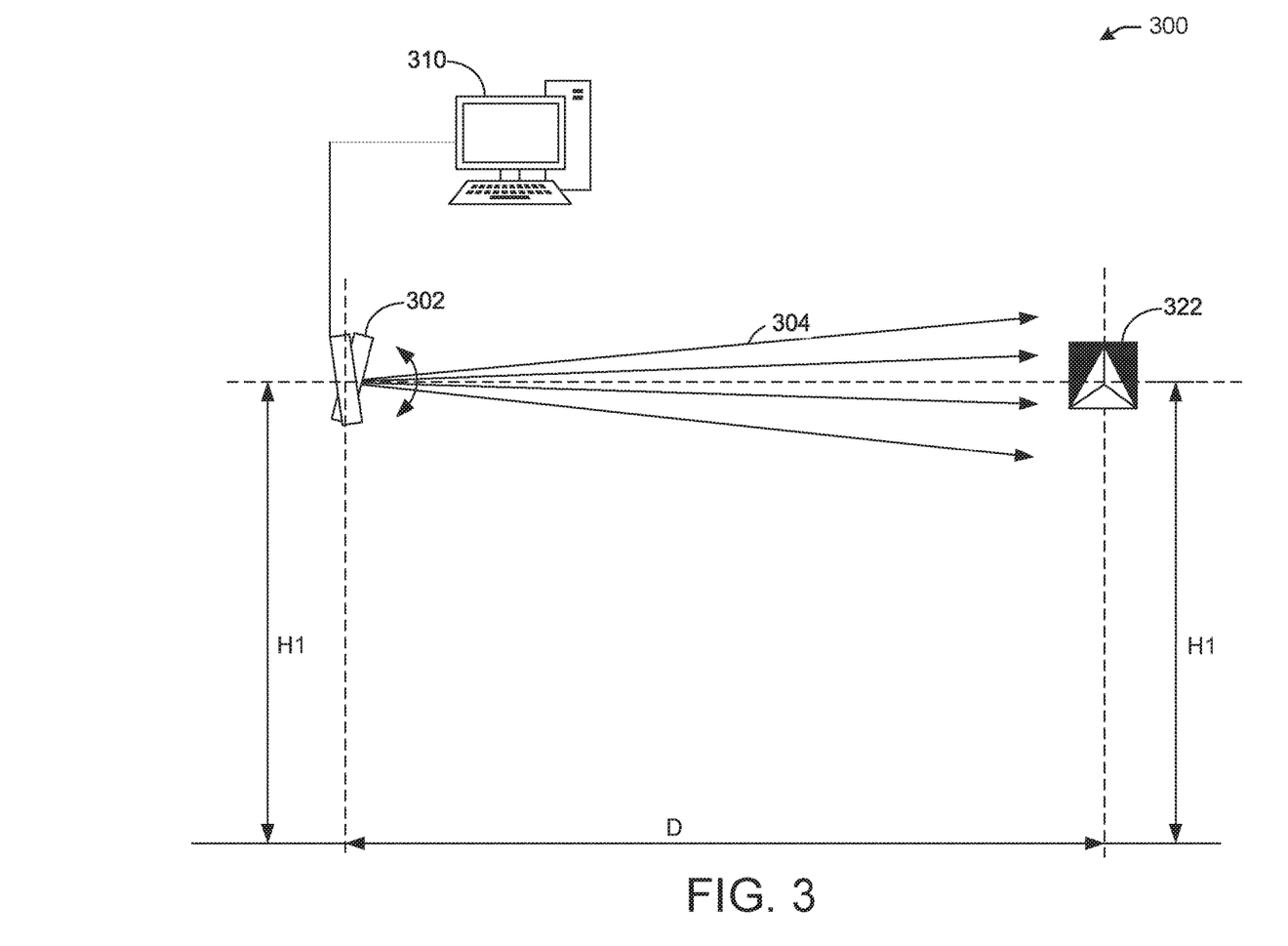
FIG. 3 depicts an illustrative schematic diagram for radar elevation angle validation, in accordance with one or more example embodiments of the present disclosure.

FIG. 3 depicts an illustrative schematic diagram 300 for radar elevation angle validation, in accordance with one or more example embodiments of the present disclosure.

Referring to FIG. 3, there is shown a radar 302 facing a corner reflector 322. The radar 302 may be capable of rotating upward or downward relative to the corner reflector 322. The radar 302 may be rotated at various steps of degrees. The radar 302 may transmit signals 304 at each step of the degree of variation. The radar 302 may then take measurements of reflected signals from the corner reflector 322 at each step. After stepping through a number of degrees, a series of signal energy levels (e.g., SNR data, RSSI, or other means of measuring signal energy levels) may be collected based on the measurements. The corner reflector 322 may reflect back echo signals towards the radar 302, which utilizes a computer system 310 to process the captured data from the reflected signals. The captured data may be fitted to an energy pattern by mapping out points on a curve. An average energy pattern of radar 302 may be generated based on the measurements. This process may be repeated with other radars to collect their respective measurements of reflected signals from the corner reflector 322. This may result in an additional series of signal energy levels at each step. The computer system 310 may generate an average energy pattern from all the generated energy patterns of the radars. The average energy pattern may be used as a baseline for validating the radar elevation angle of the radar under test. Further, this data may be presented in a baseline lookup table such that each entry of the lookup table correlates and energy level value to a radar elevation angle at a specific location. This may result in searchable dataset to retrieve relevant information based on the various signal measurements. It is understood that the above descriptions are for purposes of illustration and are not meant to be limiting.

Figure 4:
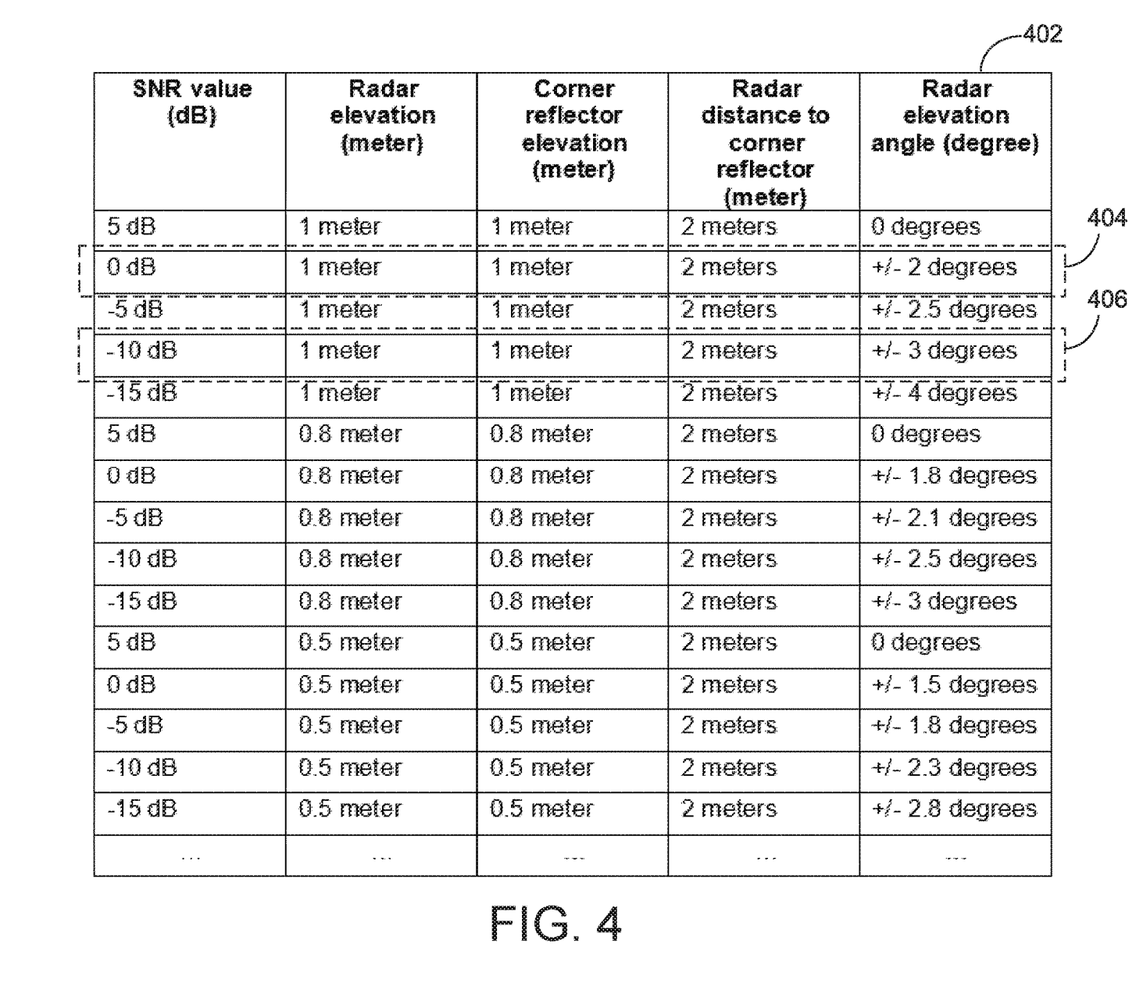
FIG. 4 depicts an illustrative schematic diagram for radar elevation angle validation, in accordance with one or more example embodiments of the present disclosure.

FIG. 4 depicts an illustrative schematic diagram for radar elevation angle validation, in accordance with one or more example embodiments of the present disclosure.

Referring to FIG. 4, there is shown an illustrative baseline lookup table 402 that may be used to validate a radar under test.

The baseline lookup table 402 may be a representative of a plurality of tests performed using a plurality of radars. The baseline lookup table 402 may be an average of energy levels collected from a plurality of radars while varying each radar elevation angle. These energy levels may have been collected from the reflected signals at each radar elevation angle for each radar. The baseline lookup table 402 may be used as a lookup table to determine a radar elevation angle of the radar under test that may be mounted on a vehicle before the vehicle is ready to be used in the real world. This may help in validating whether a radar under test is generating acceptable and reliable data during operation when the radar under test is mounted on a vehicle. Radar alignment uncertainty can lead to radar data uncertainty. For example, an accurate radar elevation angle helps to detect objects at a distance optimal for that radar. However, if radar elevation angle detection is off by some degrees, objects may be detected at a reduced distance resulting in uncertainty in the captured data. Since the radar under test may be covered by a fascia or other vehicle material, using the baseline lookup table 402 may facilitate a determination of an elevation angle of the radar under test without making changes to the vehicle.

Looking at the baseline lookup table 402, and entry may be selected in order to determine a radar elevation angle based on measurements of reflected signals from a corner reflector. For example, looking at row 404, it can be seen that at ±two degrees, a radar (e.g., radar 302 of FIG. 3) may have registered a signal strength value of zero dB. This value may be correlated to a particular distance and height of the radar and the corner reflector (e.g., corner reflector 322 of FIG. 3) when this baseline lookup table 402 was generated. Looking at another example row 406, it can be seen that at ±3 degrees, the signal strength value registered was −10 dB. This indicates that a radar registering that signal strength is approximately at the same radar elevation angle.

In one or more embodiments, when it radar under test that is mounted on a vehicle is placed at a same elevation and distance to a corner reflector, where the corner reflector is that a particular elevation, the radar under test may transmit signals and detects reflected signals off of the corner reflector. The radar under test may measure the signal energy level of the reflected signals. Based on the baseline lookup table 402, the measured signal energy level may be matched to an entry in the baseline lookup table 402.

In one or more embodiments, a radar elevation angle validation system may utilize the baseline lookup table 402 to validate the radar under test by comparing the measured signal energy level to a corresponding entry in the baseline lookup table to retrieve a radar elevation angle. That entry of the baseline lookup table may indicate that the radar elevation angle should be at a certain value. If the value of the radar elevation angle is greater than a threshold, it may be determined that the radar under test has failed the validation test and that adjustment would need to be made to the radar, or it may need to be replaced. If the value of the radar elevation angle is less than a threshold, it may be determined that the radar under test has passed the validation test. For example, if the threshold is two degrees from the peak value, then if the corresponding entry in the lookup table returns a radar elevation value greater than two degrees from the peak value, it may be determined that the radar under test is either pitched too high or pitched too low from the optimal pitch angle of zero degrees. In such a case, the radar under test may be deemed to have failed the validation test. However, if the corresponding entry in the lookup table returns a radar elevation value lower than or equal to two degrees from the peak value, it may be determined that the radar under test is in a passing state. The peak value may be associated with an optimal pitch angle of zero degrees. In the example of the baseline lookup table 402, this optimal pitch angle of zero degrees correlates to a signal energy level of 5 dB.

It should be understood that the values illustrated in the baseline lookup table 402 are for illustrative purposes only and that other signal energy values and metrics may be used to correlate with a radar elevation angle at various locations of one or more radars and a corner reflector.

Figure 5:
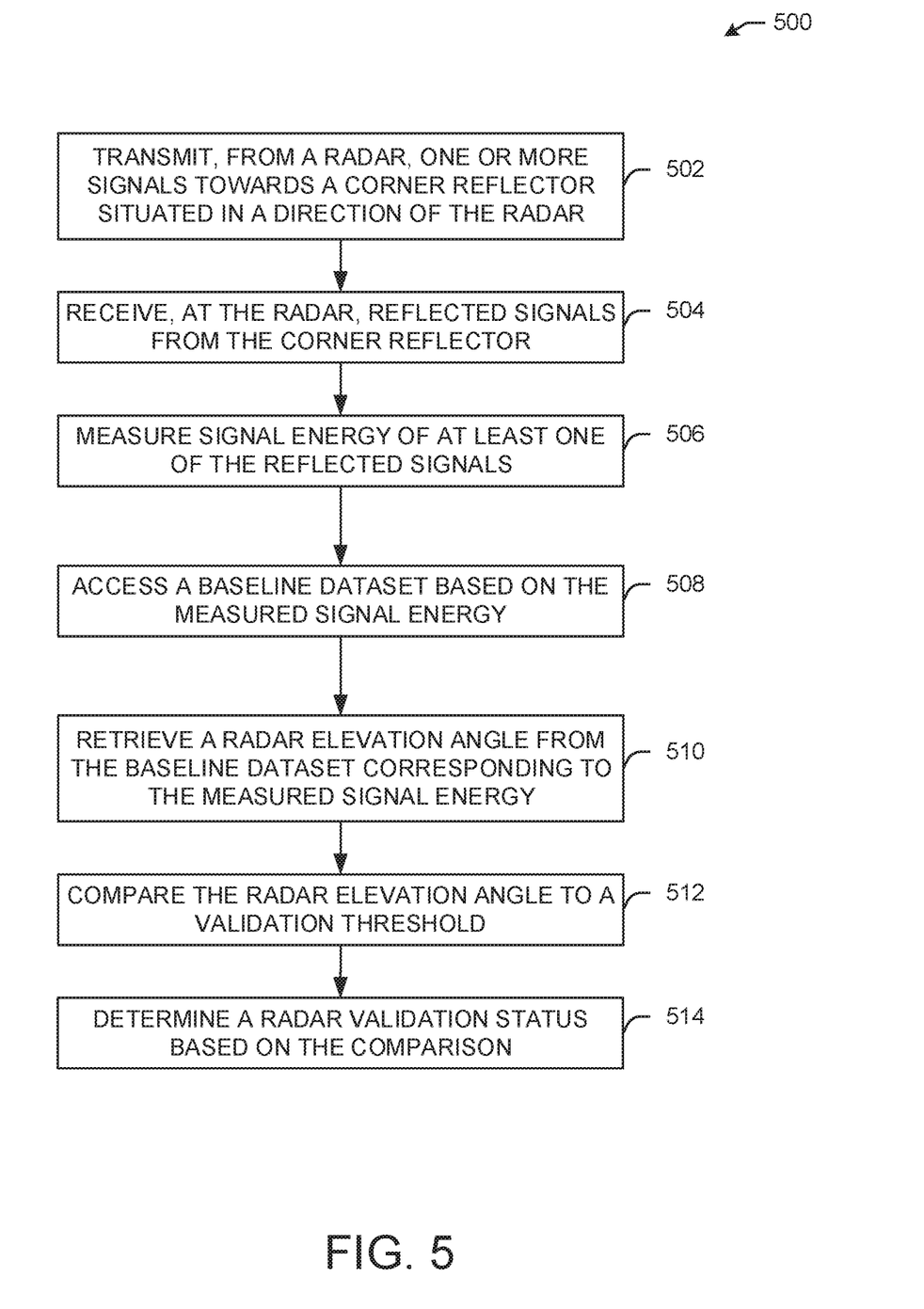
FIG. 5 illustrates a flow diagram of a process for an illustrative radar elevation angle validation system, in accordance with one or more example embodiments of the present disclosure.

FIG. 5 illustrates a flow diagram of process 500 for an illustrative radar elevation angle validation system, in accordance with one or more example embodiments of the present disclosure.

At block 502, a radar elevation angle validation system may transmit, from a radar, one or more signals towards a corner reflector situated in a direction of the radar.

At block 504, the radar elevation angle validation system may receive, at the radar, reflected signals from the corner reflector.

At block 506, the radar elevation angle validation system may measure signal energy of at least one of the reflected signals. A peak signal energy value may indicate an optimal radar ranging.

At block 508, the radar elevation angle validation system may access a baseline dataset based on the measured signal energy. The baseline dataset may comprise data associated with at least one of a signal strength, an elevation of the radar, an elevation of the corner reflector, or a distance between the radar and the corner reflector. The baseline dataset may comprise averages of one or more measurements using a plurality of radars.

At block 510, the radar elevation angle validation system may retrieve a radar elevation angle from the baseline dataset corresponding to the measured signal energy.

At block 512, the radar elevation angle validation system may compare the radar elevation angle to a validation threshold. The radar elevation angle validation system may determine the radar is pitched upwards or downwards based on a deviation from the validation threshold.

At block 514, the radar elevation angle validation system may determine a radar validation status based on the comparison. The radar validation status may be a pass or a fail. The radar elevation angle validation system may determine that the first radar elevation angle is greater than the validation threshold. The radar elevation angle validation system may then determine that the radar validation status is a fail. In some other scenarios, the radar elevation angle validation system may determine the first radar elevation angle is less than or equal to the validation threshold. The radar elevation angle validation system may then determine that the radar validation status is a pass.

It is understood that the above descriptions are for purposes of illustration and are not meant to be limiting.

Figure 6:
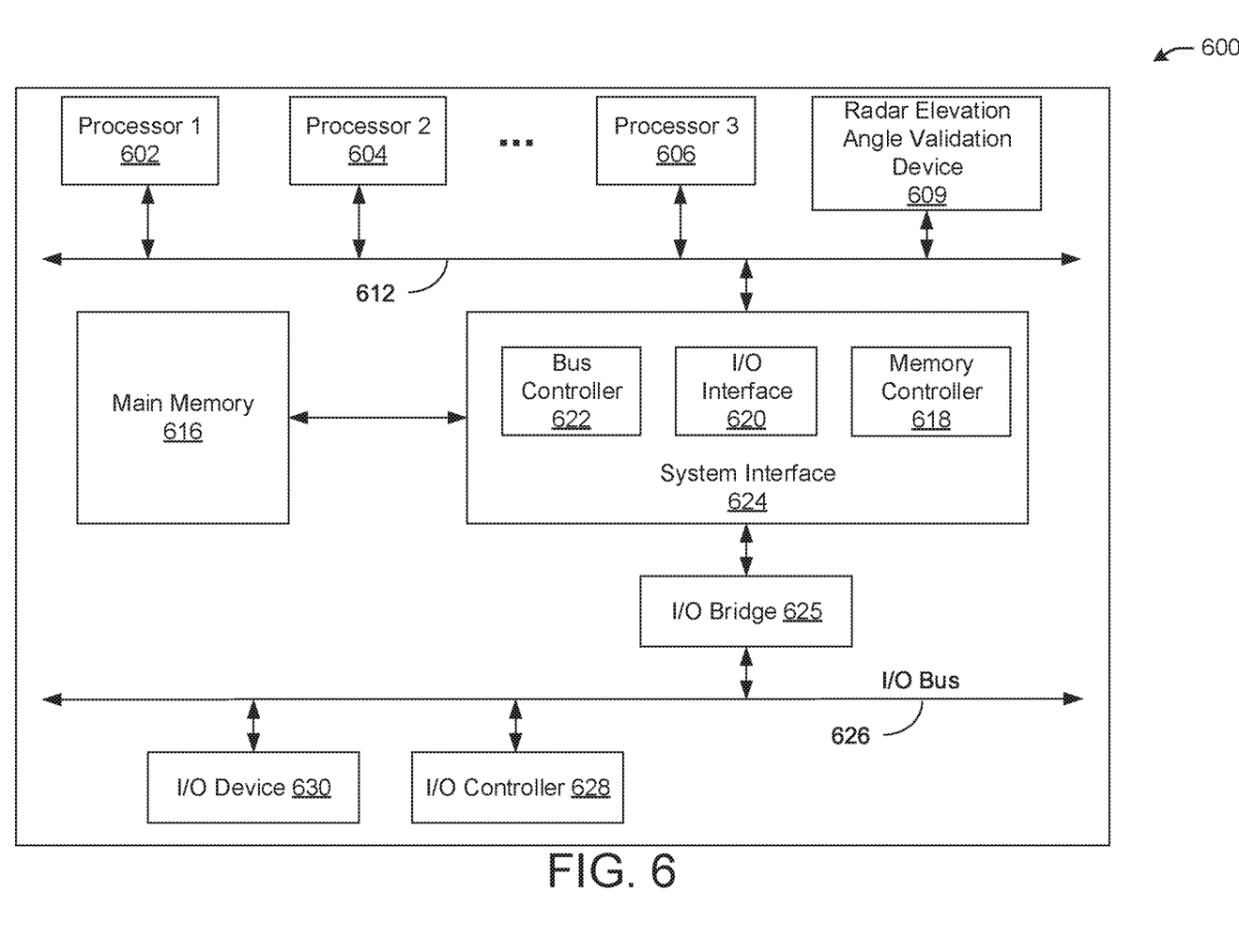
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent one or more processor(s) 132 and/or the computer system 210 of FIG. 2, and, therefore, may assess and validate the sensors in the sensor system 110 of FIG. 1. The computer system (system) includes one or more processor(s) 602-606. Processor(s) 602-606 may include one or more internal levels of cache (not shown) and a bus controller (e.g., bus controller 622) or bus interface (e.g., I/O interface 620) unit to direct interaction with the processor bus 612. A radar elevation angle validation device 609 may also be in communication with the processor(s) 602-606 and may be connected to the processor bus 612.

Processor bus 612, also known as the host bus or the front side bus, may be used to couple the processor(s) 602-606, and/or the radar elevation angle validation device 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridge(s) 625 or I/O device(s) 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processor(s) 602-606 and/or the radar elevation angle validation device 609. Another type of user input device includes cursor control, such as a mouse, a trackball, or cursor direction keys for communicating direction information and command selections to the processor(s) 602-606, and/or the radar elevation angle validation device 609, and for controlling cursor movement on the display device.

System 600 may include a dynamic storage device, referred to as main memory 616, or a random access memory (RAM) or other computer-readable devices coupled to the processor bus 612 for storing information and instructions to be executed by the processor(s) 602-606, and/or the radar elevation angle validation device 609. Main memory 616 also may be used for storing temporary variables or other intermediate information during execution of instructions by the processor(s) 602-606, and/or the radar elevation angle validation device 609. System 600 may include read-only memory (ROM), and/or other static storage device coupled to the processor bus 612 for storing static information and instructions for the processor(s) 602-606, and/or the radar elevation angle validation device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processor(s) 602-606 and/or the radar elevation angle validation device 609 to perform the process steps described herein. In alternative embodiments, circuitry may be used in place of or in combination with the software instructions. Thus, embodiments of the present disclosure may include both hardware and software components.

The processor(s) 602-606, and/or the radar elevation angle measurement device 609 may facilitate means for validating a radar elevation angle based on characterizing a number of signal energy values associated with a radar's reception of feedback signals received from a reflective structure.

The processor(s) 602-606, and/or the radar elevation angle measurement device 609 may facilitate the use of a corner reflector placed at a certain location relative to a radar under test. A corner reflector consists of three mutually perpendicular, intersecting flat surfaces, which reflect waves directly towards the source. The three intersecting surfaces often have square shapes. Radar corner reflectors made of metal are used to reflect radio waves from radar sets. Optical corner reflectors, called corner cubes, made of three-sided glass prisms, are used in surveying and laser ranging. When the corner reflector is not directly facing the radar, and as the corner reflector turns away from the radar, it causes the corner reflector to be turned off because it becomes far less reflecting.

The processor(s) 602-606, and/or the radar elevation angle measurement device 609 may facilitate the use of a corner reflector having a front reflective face surrounded by anechoic foam. The anechoic helps to absorb radio waves or signals received from the radar. The corner reflector may be placed at a different elevation and distance from the radar under test.

The processor(s) 602-606, and/or the radar elevation angle measurement device 609 may facilitate capturing data associated with signals received at the radar, based on reflected waves from the corner reflector. The processor(s) 602-606, and/or the radar elevation angle measurement device 609 may filter out the noise from surrounding objects reflecting back the waves by identifying the corner reflector by looking for an equivalent pattern response.

The processor(s) 602-606, and/or the radar elevation angle measurement device 609 may facilitate correlating the signal energy values received at a radar under test with the average energy pattern based on the assumption that an energy pattern of the radar includes a maximum point of radiation, which is at an elevation angle of zero degrees, such that the general pattern tapers off as the elevation angle increases or decreases. It is further assumed that, in general, radars that are used in an application such as a vehicle have similar energy patterns such that they follow the same trend, and the maximum radiation is approximately at the same location on the energy pattern.

The processor(s) 602-606, and/or the radar elevation angle measurement device 609 may perform signal measurements by varying the radar elevation angle by certain degrees to map out points on a curve resulting in an energy pattern. These measurements may be signal energy values associated with a radar's reception of feedback signals received from a reflective structure. An average energy pattern may be generated based on the measurements. The average energy pattern may become a baseline for validating the radar elevation angle of a radar under test.

The processor(s) 602-606, and/or the radar elevation angle measurement device 609 may generate entries in a lookup table resulting in a searchable dataset that may form a dataset based on the signal measurements performed by varying the radar elevation angle and capturing signal energy levels as they are reflected by a corner reflector towards the radar. Each entry in the lookup table may be generated based on the location of the corner reflector, the location of the radar, a radar elevation angle, and a signal energy value. Based on varying the radar elevation angle, while the corner reflector is stationary at the same position, signal energy values may be captured for each of the radar elevation angles. These entries may be averages of various signal measurements taken using different radars. That is, the entries in the lookup table may be taken first of a first radar, then repeated for second radar, and so on. After all the values are captured, the baseline lookup table may be generated by averaging all the respected entries in the lookup tables associated with each radar. This may result in searchable dataset to retrieve relevant information based on the various signal measurements.

The processor(s) 602-606, and/or the radar elevation angle measurement device 609 may validate a radar installed on a vehicle by placing the radar under test at a specific location relative to a corner reflector affixed at a specific elevation and distance from the radar under test.

The processor(s) 602-606, and/or the radar elevation angle measurement device 609 may determine the position of a corner reflector. For example, a first corner reflector on the reflection structure may be located at a first distance and a first height relative to the radar under test. Based on that information, a radar under test may be validated by determining whether its radar elevation angle is what it is expected to be for that location of the corner reflector and the elevation and spacing of the radar under test from the corner reflector.

The processor(s) 602-606, and/or the radar elevation angle measurement device 609 may utilize the baseline lookup table that may form a dataset to validate the radar under test by comparing a captured signal value to a corresponding entry in the baseline lookup table to retrieve a radar elevation angle. By placing the radar under test at a specific location, a signal energy level may be expected to be at a certain elevation angle. The radar under test may capture data (e.g., signal energy level) of the reflected signals from the corner reflector at that specific location. That entry of the baseline lookup table may indicate that the radar elevation angle should be at a certain value. If the value of the radar elevation angle is greater than a threshold, it may be determined that the radar has failed the validation test. If the value of the radar elevation angle is less than a threshold it may be determined that the radar has passed the validation test. For example, if the threshold is two degrees from the peak value, then if the corresponding entry in the lookup table returns a radar elevation value greater than two degrees from the peak value, it may be determined that the radar under test is either pitched too high or pitched too low from the optimal pitch angle of zero degrees. In such a case, the radar under test may be deemed to have failed the validation test. However, if the corresponding entry in the lookup table returns a radar elevation value lower than or equal to two degrees from the peak value, it may be determined that the radar under test is in a passing state.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In one or more embodiments, there may be a device comprising processing circuitry coupled to storage, the processing circuitry configured to: transmit one or more signals towards a corner reflector situated in a direction of a radar; receive reflected signals from the corner reflector at the radar; measure signal energy of at least one of the reflected signals; access a baseline lookup table to determine a first table entry that corresponds to the measured signal energy; retrieve a first radar elevation angle corresponding to the first table entry based on the measured signal energy; compare the first radar elevation angle to a validation threshold; and determine a radar validation status based on the comparison. The baseline lookup table may comprise one or more entries associated with at least one of a signal strength, an elevation of the radar, an elevation of the corner reflector, or a distance between the radar and the corner reflector. The radar validation status may be a pass or a fail. The processing circuitry may be further configured to: determine the first radar elevation angle may be greater than the validation threshold; and determine that the radar validation status may be a fail. The processing circuitry may be further configured to: determine the first radar elevation angle may be less than or equal to the validation threshold; and determine that the radar validation status may be a pass. The processing circuitry may be further configured to determine the radar may be pitched upwards or downwards based on a deviation from the validation threshold. A peak signal energy value indicates an optimal radar ranging. The baseline lookup table entries may be averages of one or more measurements using a plurality of radars.

In one or more embodiments, there may be a non-transitory computer-readable medium storing computer-executable instructions which when executed by one or more processors result in performing operations comprising: transmitting one or more signals towards a corner reflector situated in a direction of a radar; receiving reflected signals from the corner reflector at the radar; measuring signal energy of at least one of the reflected signals; accessing a baseline lookup table to determine a first table entry that corresponds to the measured signal energy; retrieving a first radar elevation angle corresponding to the first table entry based on the measured signal energy; comparing the first radar elevation angle to a validation threshold; and determining a radar validation status based on the comparison.

The baseline lookup table may comprise one or more entries associated with at least one of a signal strength, an elevation of the radar, an elevation of the corner reflector, or a distance between the radar and the corner reflector. The radar validation status may be a pass or a fail. The operations further comprise: determining the first radar elevation angle may be greater than the validation threshold; and determining that the radar validation status may be a fail. The operations further comprise: determining the first radar elevation angle may be less than or equal to the validation threshold; and determining that the radar validation status may be a pass. The operations further comprise determining the radar may be pitched upwards or downwards based on a deviation from the validation threshold. A peak signal energy value indicates an optimal radar ranging. The baseline lookup table entries may be averages of one or more measurements using a plurality of radars.

In one or more embodiments, there may be a method comprising: transmitting one or more signals towards a corner reflector situated in a direction of a radar; receiving reflected signals from the corner reflector at the radar; measuring signal energy of at least one of the reflected signals; accessing a baseline lookup table to determine a first table entry that corresponds to the measured signal energy; retrieving a first radar elevation angle corresponding to the first table entry based on the measured signal energy; comparing the first radar elevation angle to a validation threshold; and determining a radar validation status based on the comparison.

The baseline lookup table may comprise one or more entries associated with at least one of a signal strength, an elevation of the radar, an elevation of the corner reflector, or a distance between the radar and the corner reflector. The radar validation status may be a pass or a fail. The method may further comprise determining the first radar elevation angle may be greater than the validation threshold; and determining that the radar validation status may be a fail. The method may further comprise determining the first radar elevation angle may be less than or equal to the validation threshold; and determining that the radar validation status may be a pass. The method may further comprise determining the radar may be pitched upwards or downwards based on a deviation from the validation threshold. A peak signal energy value indicates an optimal radar ranging. The baseline lookup table entries may be averages of one or more measurements using a plurality of radars.

In one or more embodiments, there may be an apparatus comprising means for: transmitting one or more signals towards a corner reflector situated in a direction of a radar; receiving reflected signals from the corner reflector at the radar; measuring signal energy of at least one of the reflected signals; accessing a baseline lookup table to determine a first table entry that corresponds to the measured signal energy; retrieving a first radar elevation angle corresponding to the first table entry based on the measured signal energy; comparing the first radar elevation angle to a validation threshold; and determining a radar validation status based on the comparison.

The baseline lookup table comprises one or more entries associated with at least one of a signal strength, an elevation of the radar, an elevation of the corner reflector, or a distance between the radar and the corner reflector. The radar validation status may be a pass or a fail. The apparatus may further include the means for determining the first radar elevation angle may be greater than the validation threshold; and determining that the radar validation status may be a fail. The apparatus may further include the means for determining the first radar elevation angle may be less than or equal to the validation threshold; and determining that the radar validation status may be a pass. The apparatus may further include the means for determining the radar may be pitched upwards or downwards based on a deviation from the validation threshold. A peak signal energy value indicates an optimal radar ranging. The baseline lookup table entries are averages of one or more measurements using a plurality of radars.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device, the device comprising processing circuitry coupled to storage, the processing circuitry configured to:
transmit, from a radar, one or more signals towards a corner reflector situated in a direction of the radar;
receive, at the radar, reflected signals from the corner reflector;
measure signal energy of at least one of the reflected signals;
access a baseline dataset stored in a datastore, the baseline dataset comprising a plurality of radar elevation angles indexed in the datastore by different sets of signal energy values, corner reflector elevation values, and radar-to-reflector distances;
compare the measured signal energy to one or more of the plurality of signal energy values contained in the baseline dataset;
retrieve a radar elevation angle from the plurality of radar elevation angles contained in the baseline dataset that is associated with a signal energy value of the plurality of signal energy values matching to the measured signal energy;
compare the radar elevation angle retrieved from the baseline dataset to a validation threshold;
determine whether the radar is pitched upwards or downwards based on a deviation of the radar elevation angle of the baseline dataset from the validation threshold; and
determine a radar validation status based on the comparison;
wherein the baseline dataset correlates signal energy values with an average energy pattern based on measurements associated with a plurality of other radars.

2. The device of claim 1, wherein the baseline dataset further comprises an elevation of the corner reflector or a distance between the radar and the corner reflector so as to be associated with a respective one of the plurality of signal energy values and a respective one of the plurality of radar elevation angles.

3. The device of claim 1, wherein the validation threshold is predefined and the radar validation status is a pass or a fail.

4. The device of claim 1, wherein the processing circuitry is further configured to:
verify the radar elevation angle is greater than the validation threshold; and
establish that the radar validation status is a fail.

5. The device of claim 1, wherein the processing circuitry is further configured to:
verify the radar elevation angle is less than or equal to the validation threshold;
establish that the radar validation status is a pass.

6. The device of claim 1, wherein a peak signal energy value indicates an optimal radar ranging.

7. A non-transitory computer-readable medium storing computer-executable instructions which when executed by one or more processors result in performing operations comprising:
transmitting, from a radar, one or more signals towards a corner reflector situated in a direction of the radar;
receiving, at the radar, reflected signals from the corner reflector at the radar;
measuring signal energy of at least one of the reflected signals;
accessing a baseline dataset stored in a datastore, the baseline dataset comprising a plurality of radar elevation angles indexed in the datastore by different sets of signal energy values, corner reflector elevation values, and radar-to-reflector distances;
comparing the measured signal energy to one or more of the plurality of signal energy values contained in the baseline dataset;
retrieving a radar elevation angle from the plurality of radar elevation angles contained in the baseline dataset that is associated with a signal energy value of the plurality of signal energy values matching to the measured signal energy;
comparing the radar elevation angle retrieved from the baseline dataset to a validation threshold;
determining whether the radar is pitched upwards or downwards based on a deviation of the radar elevation angle of the baseline dataset from the validation threshold; and
determining a radar validation status based on the comparison.

8. The non-transitory computer-readable medium of claim 7, wherein the baseline dataset further comprises an elevation of the corner reflector or a distance between the radar and the corner reflector so as to be associated with a respective one of the plurality of signal energy values and a respective one of the plurality of radar elevation angles.

9. The non-transitory computer-readable medium of claim 7, wherein the validation threshold is predefined and the radar validation status is a pass or a fail.

10. The non-transitory computer-readable medium of claim 7, wherein the operations further comprise:
verifying the radar elevation angle is greater than the validation threshold; and
establishing that the radar validation status is a fail.

11. The non-transitory computer-readable medium of claim 7, wherein the operations further comprise:
verifying the radar elevation angle is less than or equal to the validation threshold;
establishing that the radar validation status is a pass.

12. The non-transitory computer-readable medium of claim 7, wherein a peak signal energy value indicates an optimal radar ranging.

13. The non-transitory computer-readable medium of claim 7, wherein the baseline dataset comprises averages of one or more measurements using a plurality of radars.

14. A method comprising:
transmitting, from a radar, one or more signals towards a corner reflector situated in a direction of the radar;
receiving, at the radar, reflected signals from the corner reflector at the radar;
measuring signal energy of at least one of the reflected signals;
accessing a baseline dataset stored in a datastore, the baseline dataset comprising a plurality of radar elevation angles indexed in the datastore by different sets of signal energy values, corner reflector elevation values, and radar-to-reflector distances;

comparing the measured signal energy to one or more of the plurality of signal energy values contained in the baseline dataset;

retrieving a radar elevation angle from the plurality of radar elevation angles contained in the baseline dataset that is associated with a signal energy value of the plurality of signal energy values matching the measured signal energy;

comparing the radar elevation angle retrieved from the baseline dataset to a validation threshold;

determining whether the radar is pitched upwards or downwards based on a deviation of the radar elevation angle of the baseline dataset from the validation threshold; and determining a radar validation status based on the comparison.

15. The method of claim 14, wherein the baseline dataset further comprises an elevation of the corner reflector or a distance between the radar and the corner reflector so as to be associated with a respective one of the plurality of signal energy values and a respective one of the plurality of radar elevation angles.

16. The method of claim 14, wherein the validation threshold is predefined and the radar validation status is a pass or a fail.

17. The method of claim 14, further comprising:

verify the radar elevation angle is greater than the validation threshold; and establishing that the radar validation status is a fail.

* * * * *